US012506841B2

(12) United States Patent
Huo et al.

(10) Patent No.: US 12,506,841 B2
(45) Date of Patent: *Dec. 23, 2025

(54) SWITCHING METHOD FOR AUDIO OUTPUT CHANNEL, AND DISPLAY APPARATUS

(71) Applicant: HISENSE VISUAL TECHNOLOGY CO. LTD., Shandong (CN)

(72) Inventors: Junyi Huo, Shandong (CN); Dawei Zhang, Shandong (CN); Pengde Yu, Shandong (CN)

(73) Assignee: HISENSE VISUAL TECHNOLOGY CO. LTD., Shandong (CN)

( * ) Notice: Subject to any disclaimer, the term of this patent is extended or adjusted under 35 U.S.C. 154(b) by 158 days.

This patent is subject to a terminal disclaimer.

(21) Appl. No.: 18/326,168

(22) Filed: May 31, 2023

(65) Prior Publication Data

US 2023/0319227 A1    Oct. 5, 2023

Related U.S. Application Data

(63) Continuation of application No. PCT/CN2021/134350, filed on Nov. 30, 2021.

(30) Foreign Application Priority Data

Mar. 19, 2021 (CN) .......................... 202110296392.0
Apr. 21, 2021 (CN) .......................... 202110429853.7

(51) Int. Cl.
*H04N 21/488* (2011.01)
*G06F 3/16* (2006.01)
(Continued)

(52) U.S. Cl.
CPC ............. *H04N 5/602* (2013.01); *G06F 3/165* (2013.01); *H04N 21/43635* (2013.01); *H04N 21/4882* (2013.01)

(58) Field of Classification Search
CPC ...................................................... H04N 21/48
See application file for complete search history.

(56) References Cited

U.S. PATENT DOCUMENTS

| 11,159,785 B1* | 10/2021 | Lin ................. H04N 21/43635 |
| 2012/0093212 A1* | 4/2012 | Oh ................. H04N 21/43635 |
| | | 375/224 |

(Continued)

FOREIGN PATENT DOCUMENTS

| CN | 101453619 A | 6/2009 |
| CN | 101841677 A | 9/2010 |

(Continued)

OTHER PUBLICATIONS

International Search Report cited in PCT/CN2021/134350 dated Feb. 23, 2022, 4 pages.

(Continued)

*Primary Examiner* — Mushfikh I Alam
(74) *Attorney, Agent, or Firm* — Workman Nydegger

(57) ABSTRACT

Disclosed are a method, and a display apparatus. The method includes: in response to a switching operation for an audio output channel of an external power amplifier, acquiring a first state corresponding to the switching operation; the audio output channel of the external power amplifier includes an ARC and/or an eARC, and the first state is configured to indicate on-off state of the eARC that is designated by the switching operation; and adjusting a connection state of the ARC and the eARC according to the first state, determining a target channel for outputting audio according to an adjustment of the connection state of the ARC and the eARC, and displaying the on-off state of the eARC that matches the target channel.

16 Claims, 11 Drawing Sheets

(51) Int. Cl.
*H04N 5/60* (2006.01)
*H04N 21/4363* (2011.01)

(56) References Cited

U.S. PATENT DOCUMENTS

| | | | |
|---|---|---|---|
| 2017/0228213 A1* | 8/2017 | Kim | H04R 3/00 |
| 2017/0236489 A1 | 8/2017 | Oh | |
| 2019/0027189 A1* | 1/2019 | Saito | H04R 3/005 |
| 2020/0344445 A1 | 10/2020 | Komori et al. | |
| 2021/0099278 A1 | 4/2021 | Jean et al. | |
| 2023/0195405 A1* | 6/2023 | Kim | H04R 5/04 |
| | | | 704/275 |
| 2023/0388580 A1* | 11/2023 | Park | H04N 21/43615 |

FOREIGN PATENT DOCUMENTS

| | | |
|---|---|---|
| CN | 102104804 A | 6/2011 |
| CN | 102695013 A | 9/2012 |
| CN | 102870427 A | 1/2013 |
| CN | 103135806 A | 6/2013 |
| CN | 106803915 A | 6/2017 |
| CN | 107613378 A | 1/2018 |
| CN | 111492648 A | 8/2020 |
| CN | 111782390 A | 10/2020 |
| CN | 111954044 A | 11/2020 |
| CN | 112019782 A | 12/2020 |
| CN | 112218152 A | 1/2021 |
| CN | 113055788 A | 6/2021 |
| CN | 113064645 A | 7/2021 |
| WO | 2012142796 A1 | 10/2012 |

OTHER PUBLICATIONS

Chinese First Office Action, mailed Jun. 22, 2022, from Chinese Applic. Patent No. 202110436267.5, 18 pages.
Chinese First Office Action, mailed Jul. 5, 2022, from Chinese Applic. Patent No. 202110560435.1, 13 pages.
International Search Report, mailed Jun. 27, 2022, from PCT/CN2022/084267, 4 pages.

* cited by examiner

SWITCHING METHOD FOR AUDIO OUTPUT CHANNEL, AND DISPLAY APPARATUS

CROSS REFERENCE TO RELATED APPLICATIONS

This application is a continuation application of PCT Application No. PCT/CN2021/134350 filed Nov. 30, 2021, which claims the priority to Chinese Patent Application No. 202110429853.7, filed on Apr. 21, 2021, and claims the priority to Chinese Patent Application No. 202110296392.0, filed on Mar. 19, 2021, the entire contents of which are incorporated herein by reference.

FIELD

The present application relates to the field of display apparatus, and in particular to a switching method for an audio output channel, and a display apparatus.

BACKGROUND

In some application scenarios, a display apparatus will connect with an external power amplifier, such as an audio device. Accordingly, an audio output channel is no longer restricted to a loudspeaker arranged in the display apparatus.

SUMMARY

Embodiments of the present application provide a switching method for an audio output channel, and a display apparatus.

In a first aspect, the embodiments of present disclosure provide a display apparatus, includes: a display, configured to display an image from broadcasting system or network, and/or, a user interface; one or more high-definition multimedia interface (HDMI) ports configured to connect with one or more external power amplifiers, an audio output channel of an external power amplifier supports an audio return channel (ARC) and/or an enhanced audio return channel (eARC); a sound playing device configured to play audio; a memory, configured to store computer instructions and data associated with the display, the one or more HDMI ports and the sound playing device, and a processor, in connection with the display, the one or more HDMI ports, the sound playing device and the memory and configured to execute the computer instructions to cause the display apparatus to perform: in response to a switching operation for switching the audio output channel of the external power amplifier, acquiring a first state corresponding to the switching operation; the first state is configured to indicate on-off state of the eARC that is designated by the switching operation; and adjusting a connection state of the ARC and the eARC according to the first state, determining a target channel for audio output according to an adjustment result of the connection state of the ARC and the eARC, and displaying the on-off state of the eARC that matches the target channel.

In a second aspect, the embodiments of the present disclosure provide a method for a display apparatus, including: in response to a switching operation for switching the audio output channel of an external power amplifier, acquiring a first state corresponding to the switching operation, wherein the first state is configured to indicate on-off state of the eARC that is designated by the switching operation, the external power amplifier is connected to the display apparatus via an HDMI, and the audio output channel of the external power amplifier supports an ARC and/or an eARC; adjusting a connection state of the ARC and the eARC according to the first state; and determining a target channel for audio output according to an adjustment of the connection state of the ARC and the eARC, and displaying the on-off state of the eARC that matches the target channel.

DETAILED DESCRIPTION OF THE EMBODIMENTS

In order to make the objectives and the embodiments of the present application clearer, the embodiments of the present application will be clearly and completely described below with reference to the drawings in the embodiments of the present application. Obviously, the described embodiments are merely some embodiments rather than all embodiments of the present application.

It should be noted that the brief description of the terms in the present application merely is only for facilitating understanding of the embodiments described below and is not intended to limit the embodiments of the present application. Unless otherwise specified, these terms should be understood in ordinary and plain meaning.

The terms "first", "second", "third", etc. in the description and claims of the present application and the above drawings are used to distinguish similar or the same type of objects or entities, but do not necessarily limit a particular order or a sequential order, unless otherwise stated.

Figure 1:
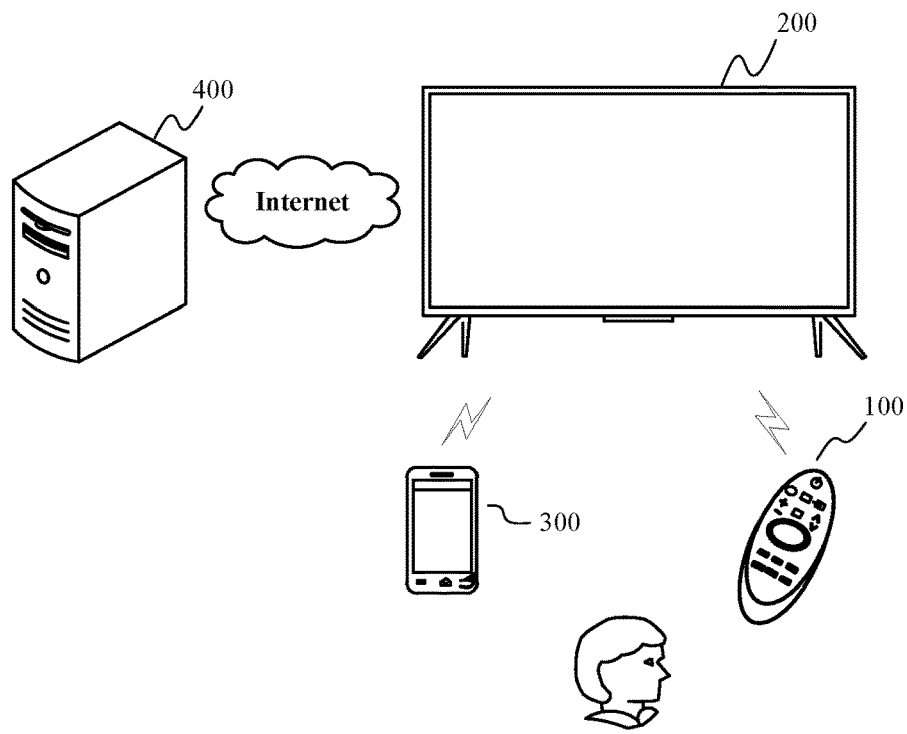
FIG. 1 shows a scenario of a display apparatus according to some embodiments.

FIG. 1 is a schematic diagram of a scenario of a display apparatus according to embodiments. As shown in FIG. 1, a display apparatus 200 is further in data communication with a server 400. A user may operate the display apparatus 200 via a smart device 300 or a control device 100.

In some embodiments, the control device 100 may be a remote controller, a communication between the remote controller and a display apparatus includes an infrared protocol communication or a Bluetooth protocol communication, as well as at least one of other short distance communication modes, and the display apparatus 200 is controlled in a wireless or wired manner. A user may control the display apparatus 200 by inputting a user command via at least one of a key, a voice input, a control panel input, etc. on the remote controller.

In some embodiments, the smart device 300 may include any one of a mobile terminal, a tablet computer, a computer, a laptop, an augmented reality (AR)/virtual reality (VR) device, etc.

In some embodiments, the smart device 300 may also be used to control a display apparatus 200. For example, an application running on the smart device is used to control the display apparatus 200.

In some embodiments, the display apparatus 200 may receive a command without using the smart device or control device described above, but is controlled by a user via a touch or a gesture.

In some embodiments, the smart device 300 may also be configured to be in data communication with the display apparatus.

In some embodiments, the display apparatus 200 may further be controlled by a different device other than the control device 100 and the smart device 300. For example, a module for obtaining a voice command arranged inside the display apparatus 200 directly receives a voice command from a user for control, or a voice control device arranged outside the display apparatus 200 receives a voice command from a user.

In some embodiments, a display apparatus 200 may further be in data communication with the server 400. The display apparatus 200 may be in communication connection with other networks via a local area network (LAN) and a wireless local area network (WLAN). The server 400 may provide various contents and interactions for the display apparatus 200. The server 400 may be a cluster or a plurality of clusters, and may include one or more types of servers.

Figure 2:
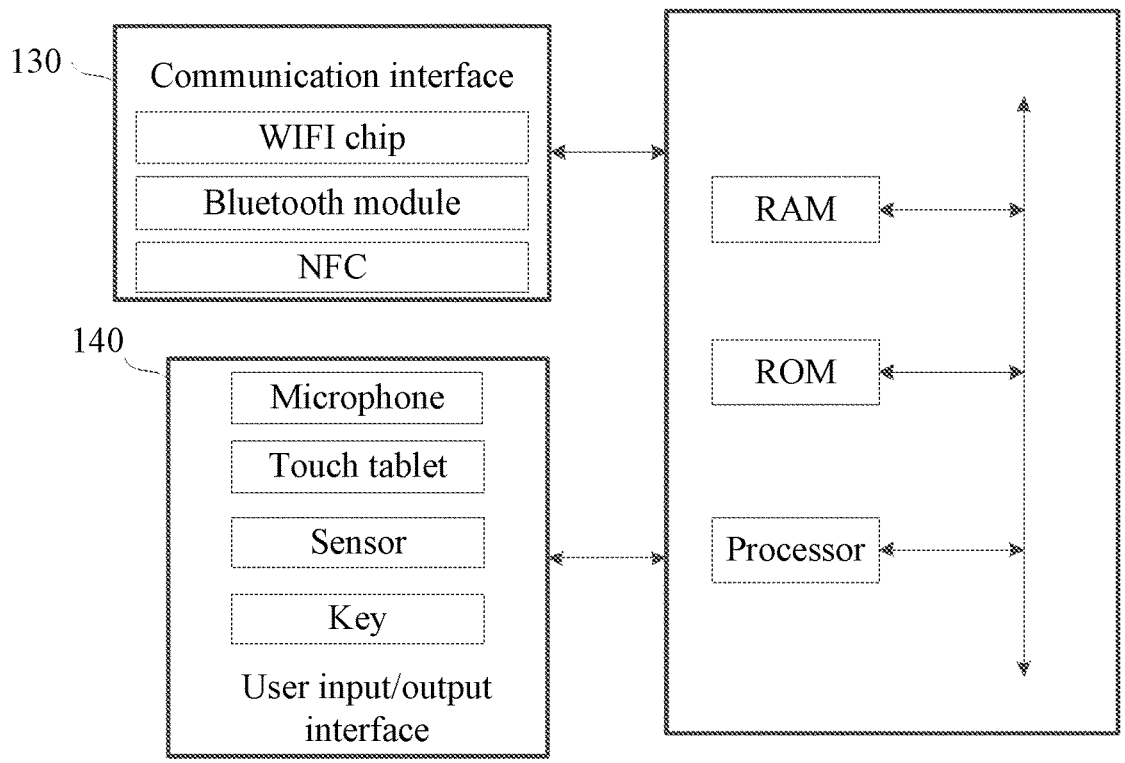
FIG. 2 shows a block diagram of hardware configuration of a control device 100 according to some embodiments.

FIG. 2 shows a block diagram of configuration of a control device 100 according to embodiments. As shown in FIG. 2, the control device 100 includes a communication interface 130, a user input/output interface 140, a memory, and a power supply. The control device 100 may receive an operation command input from a user, and converts the operation command into an instruction that may be identified and responded by a display apparatus 200, so as to play an interaction role between the user and the display apparatus 200.

In some embodiments, the communication interface 130 is configured to be in communication with the outside, and includes at least one of a wireless fidelity (WIFI) chip, a Bluetooth module, a near field communication (NFC) module or an alternative module.

In some embodiments, the user input/output interface 140 includes at least one of a microphone, a touch tablet, a sensor, a key or an alternative module.

Figure 3:
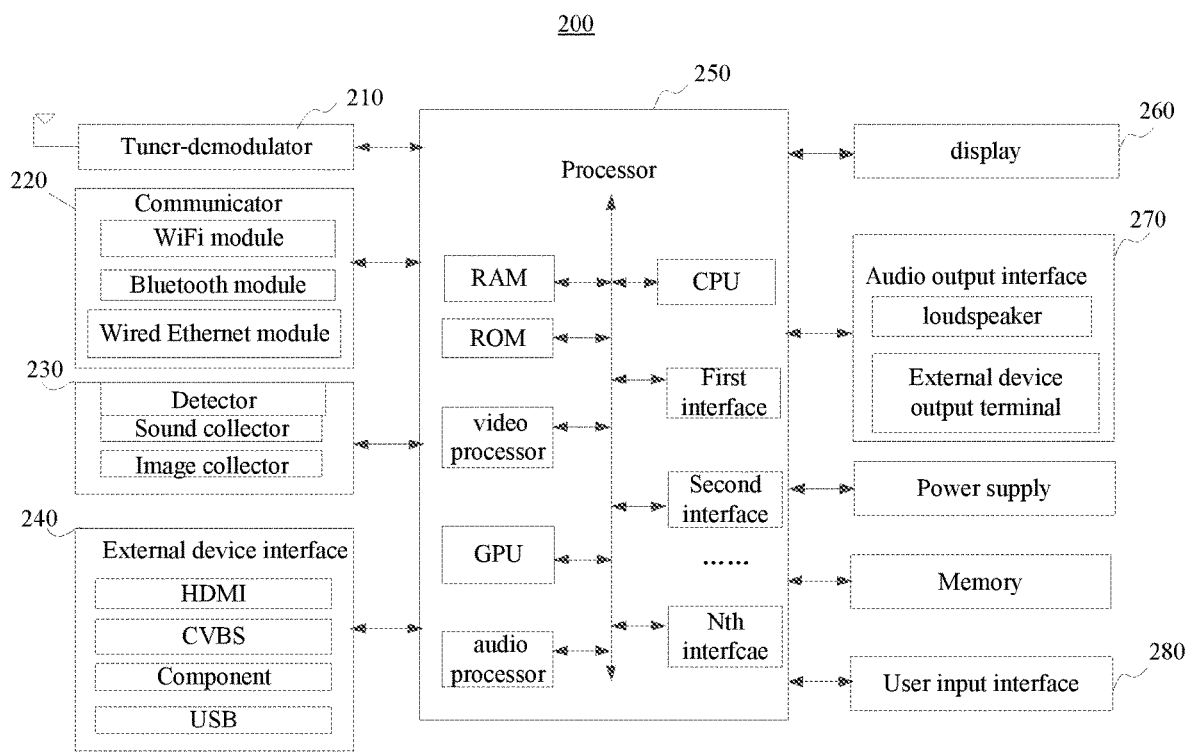
FIG. 3 shows a block diagram of hardware configuration of a display apparatus 200 according to some embodiments.

FIG. 3 shows a block diagram of hardware configuration of a display apparatus 200 according to the embodiments.

In some embodiments, the display apparatus 200 includes at least one of a tuner-demodulator 210, a communicator 220, a detector 230, an external device interface 240, a processor 250, a display 260, an audio output interface 270, a memory, a power supply and a user interface.

In some embodiments, the display 260 includes a panel component for presenting a picture and a drive component for driving picture display, and is configured to receive a picture signal output from a controller, to display a video content, a picture content, an item on a menu operation interface, a user interface (UI) for user operation, etc.

In some embodiments, the display 260 may be at least one of a liquid crystal display, an organic light-emitting diode (OLED) display, or a projection display, and may further be a projection apparatus and a projection screen.

In some embodiments, the tuner-demodulator 210 receives broadcast television (TV) signals in a wired or wireless manner, and demodulates audio and video signals, such as electronic program guide (EPG) data signals, from the plurality of wireless or wired broadcast TV signals.

In some embodiments, the communicator 220 is a component for communicating with an external device or a server according to various types of communication protocols. For example, the communicator may include at least one of a WIFI module, a Bluetooth module, a wired Ethernet module, other network communication protocol chips or NFC protocol chips, and an infrared receiver. The display apparatus 200 may establish transmission and reception of a control signal and a data signal with the control device 100 or the server 400 via the communicator 220.

In some embodiments, the detector 230 is configured to collect a signal from external environment or a signal for interacting with outside. For example, the detector 230 includes a light receiver, and a sensor for collecting ambient light intensity; or, the detector 230 includes an image collector, such as a camera, which may be configured to collect external environment scenarios, user attributes or interaction gestures of a user; or, the detector 230 includes a sound collector, such as a microphone, which is configured to receive external sound.

In some embodiments, the external apparatus interface 240 may include, but not limited to, any one or more of the following interfaces: a high-definition multimedia interface (HDMI), an analog or digital high-definition component input interface (component), a composite video broadcast signal (CVBS), a universal serial bus (USB) input interface, and red, green and blue (RGB) ports, and may also be a composite input/output interface formed by a plurality of interfaces.

In some embodiments, the processor 250 and the tuner-demodulator 210 may be located in different individual devices. That is, the tuner-demodulator 210 may also be in an external device of a main device in which the processor 250 is located, such as an external set-top box.

In some embodiments, the processor 250 controls work of a display apparatus and responds to operations of a user via various software programs stored on a memory. The processor 250 controls an overall operation of the display apparatus 200. For example, in response to receiving a user command for selecting a UI object to be displayed on the display 260, the processor 250 may execute operations related to the object selected by the user command.

In some embodiments, an object may be any of optional objects, such as a hyperlink, an icon, or other operable controls. Operations related to the selected object include an operation of displaying a page, a document, an image, etc. associated with a hyperlink, or an operation of launching an application corresponding to the icon.

In some embodiments, the processor 250 includes a central processing unit (CPU), a video processor, an audio processor, a graphics processing unit (GPU), a random access memory (RAM), a read-only memory (ROM), and a first interface to an n$^{th}$ interface configured to perform input/output process, a communication bus, etc.

The CPU is configured to execute the instructions of the operating system and one or more applications stored in a memory, and executing various applications, data and contents according to various interaction instructions received, so as to finally display and play various audio and video contents. The CPU may include a plurality of processors, such as a main processor and one or more sub-processors.

In some embodiments, the GPU is configured to generate at least one of various graphics objects such as an icon, an operation menu, and a graphic item displayed based on a user's input. The GPU includes an arithmetic device for receiving various interactive instructions from the user to perform operation and displaying various objects according to display attributes; and further includes a renderer for rendering various objects obtained on the basis of the arithmetic device, where the rendered object is configured to be presented on a display.

In some embodiments, the video processor is configured to receive an external video signal and performing at least one of video processing such as decompression, decoding, scaling, noise reduction, frame rate conversion, resolution conversion, image synthesis, etc. according to a standard encoding and decoding protocol of the input signal, to obtain a signal that may be directly displayed or played on the display apparatus 200.

In some embodiments, the video processor includes at least one of a demultiplexing module, a video decoding module, an image synthesizing module, a frame rate conversion module, a display formatting module, etc. The demultiplexing module is configured to demultiplex an input audio and video data stream. The video decoding module is configured to process a demultiplexed video signal, including decoding, scaling, etc. The image synthesizing module, such as an image synthesizer, is configured to superpose and mix a graphical user interface (GUI) signal or generated by a graphic generator and a scaled video image, to generate an image signal for display. The frame rate conversion module is configured to convert an input video frame rate. The display formatting module is configured to receive a video output signal after frame rate conversion, and convert the video output signal to a signal conforming to a display format, such as RGB data signal.

In some embodiments, the audio processor is configured to receive an external audio signal, and perform at least one of decompression, decoding, noise reduction, digital-to-analog conversion, amplification processing, etc. according to a standard encoding and decoding protocol of an input signal, to obtain a sound signal that may be played in a loudspeaker.

In some embodiments, a user may input a user command on a GUI presented on the display 260, and then a user input interface receives, via the GUI, a command from a user. Alternatively, a user may input a user command by inputting specific sound or gesture, such that a user input interface identifies the sound or gesture via a sensor, to receive the command input from the user.

In some embodiments, the audio output interface 270 includes one or more external device output terminals and a loudspeaker.

In some embodiments, the user input interface 280 is an interface that may be configured to receive a control input (such as a physical key on a display apparatus body, or others).

In some embodiments, a system of a display apparatus may include a kernel, a shell, a file system, and an application. The kernel, the shell and the file system jointly constitute a basic operating system structure, and enable a user to manage a file, run an application, etc. After power on, the kernel is started, a kernel space is activated, hardware is abstracted, hardware parameters are initialized, and a virtual memory, a scheduler, signal, and an inter process communication (IPC) are initiated. After the kernel starts, the shell and applications are loaded. The applications are compiled into machine codes, to form a process.

Figure 4:
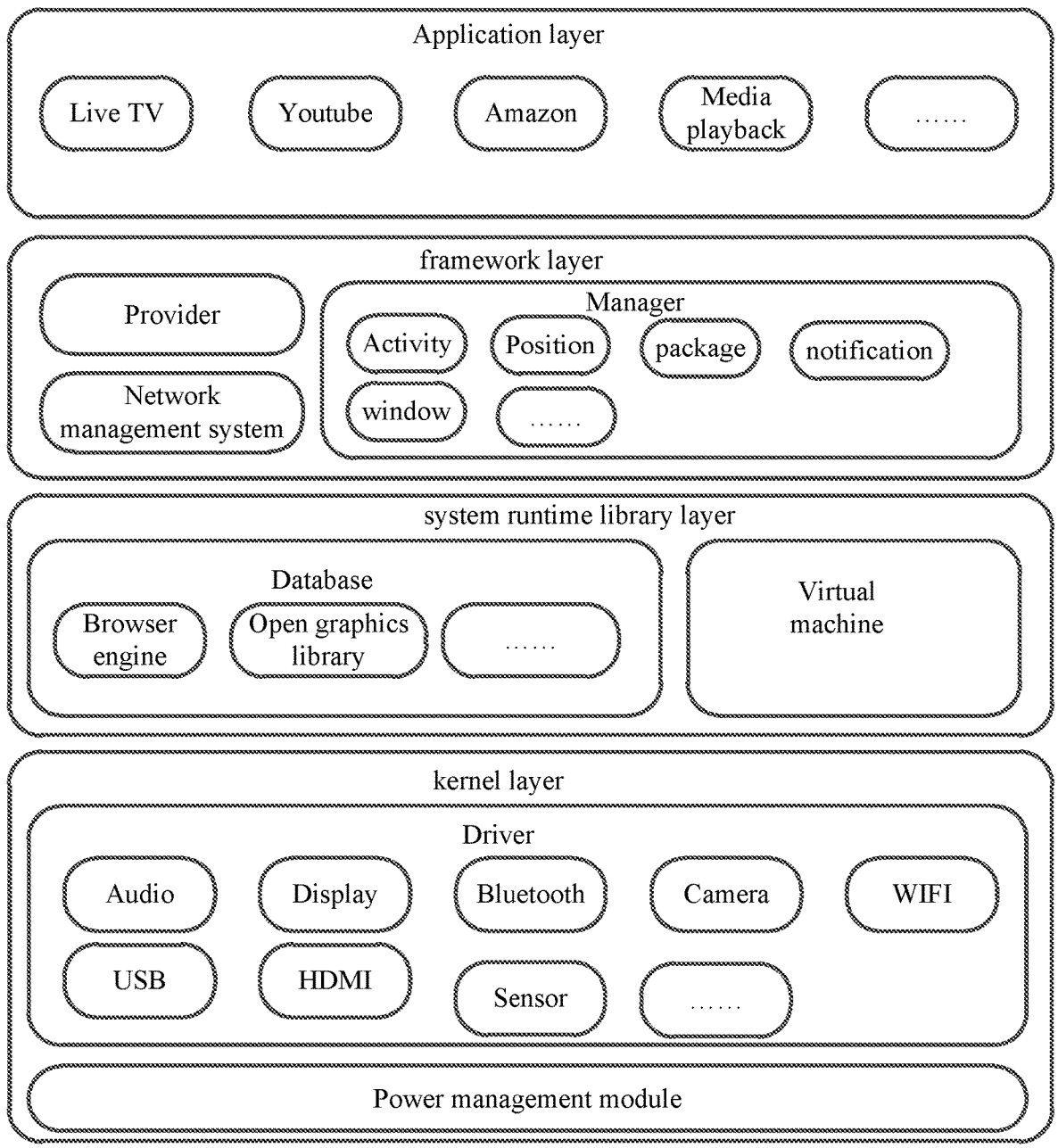
FIG. 4 shows a diagram of software configuration in a display apparatus 200 according to some embodiments.

With reference to FIG. 4, in some embodiments, a system is divided into four layers, from top to bottom, i.e., an application layer, an application framework layer (referred to as "framework layer"), an Android runtime and system library layer (referred to as "system runtime library layer"), and a kernel layer.

In some embodiments, at least one application are running in the application layer, and the applications may be a window application, a system setting application, or a clock application in the operating system, and may also be an application developed by a third-party developer. During a specific implementation, the applications in the application layer include, but not limited to, the above examples.

The framework layer provides an application programming interface (API) and a programming framework for the applications in the application layer. The application framework layer includes some predefined functions. The application framework layer is equivalent to a processing center, which decides to make the applications in the application layer perform an action. The applications may access resources in the system and obtain a system service during execution via the API interface.

As shown in FIG. 4, in the embodiments of the present application, the application framework layer includes a manager, a content provider, etc. The manager includes at least one of the following modules: an activity manager configured to interact with all activities running in the system; a location manager configured to provide access to system location services for the system services or the applications; a package manager configured to retrieve various information related to application packages currently installed on the device; a notification manager configured to control display and removal of a notification message; and a window manager configured to manage an icon, a window, a tool bar, and a desktop component on a user interface.

In some embodiments, the activity manager is configured to manage life cycles of various applications and typical navigation back functions. For example, the activity manager is configured to control exiting, opening, backing, etc. of applications. The window manager is configured to managing all window applications. For example, the window manager is configured to obtaining a size of a display screen, determining whether there is a state bar, locking a screen, capturing the screen, and controlling a change of a display window (for example, reducing a display window to a small size, dithering display, distorting the display, etc.).

In some embodiments, the system runtime library layer provides support for an upper layer, i.e., a framework layer. When the framework layer is used, an Android operating system runs a C/C++ library included in the system runtime library layer to achieve functions to be implemented by the framework layer.

In some embodiments, the kernel layer is a layer between hardware and software. As shown in FIG. 4, the kernel layer includes the following drivers: an audio driver, a display driver, a Bluetooth driver, a camera driver, a WIFI driver, a universal serial bus (USB) driver, an HDMI driver, a sensor driver (such as a fingerprint sensor, a temperature sensor and a pressure sensor), a power driver, etc.

The above description discusses a hardware/software architecture and a function implementation of the display apparatus. In some scenarios, several HDMI ports are generally provided on a display apparatus, and may be connected with an external power amplifier via HDMI ports. The external power amplifier includes a device having audio output function and play function such as an acoustic device.

In some embodiments, an audio output channel supported by the external power amplifier includes at least one of an audio return channel (ARC) and an enhanced audio return channel (eARC). ARC mode relies on a consumer electronics control (CEC) function, and the CEC function is not necessary for the eARC.

In some embodiments, if a CEC is in the on state, an external power amplifier supports to enable the ARC mode or the eARC mode; if the CEC is in the off state, the external power amplifier only supports to enable the eARC mode, and the ARC mode may be enabled, since the CEC function allows a user to control a plurality of external devices having a CEC function with the same remote controller, although audio may still be output via the eARC when the CEC function is switched off, a volume of the external power amplifier may be unadjustable by the user via the remote controller, for example, mute, volume up or volume down is not available for adjustment; and if the CEC function is switched off, and the external power amplifier only supports the ARC and does not support the eARC, the audio may not be output and played by the external power amplifier, and the audio output channel may be switched to other channels, such as a sound playing device or module (for example, a TV speaker) or Bluetooth channel arranged in a display apparatus.

Figure 5:
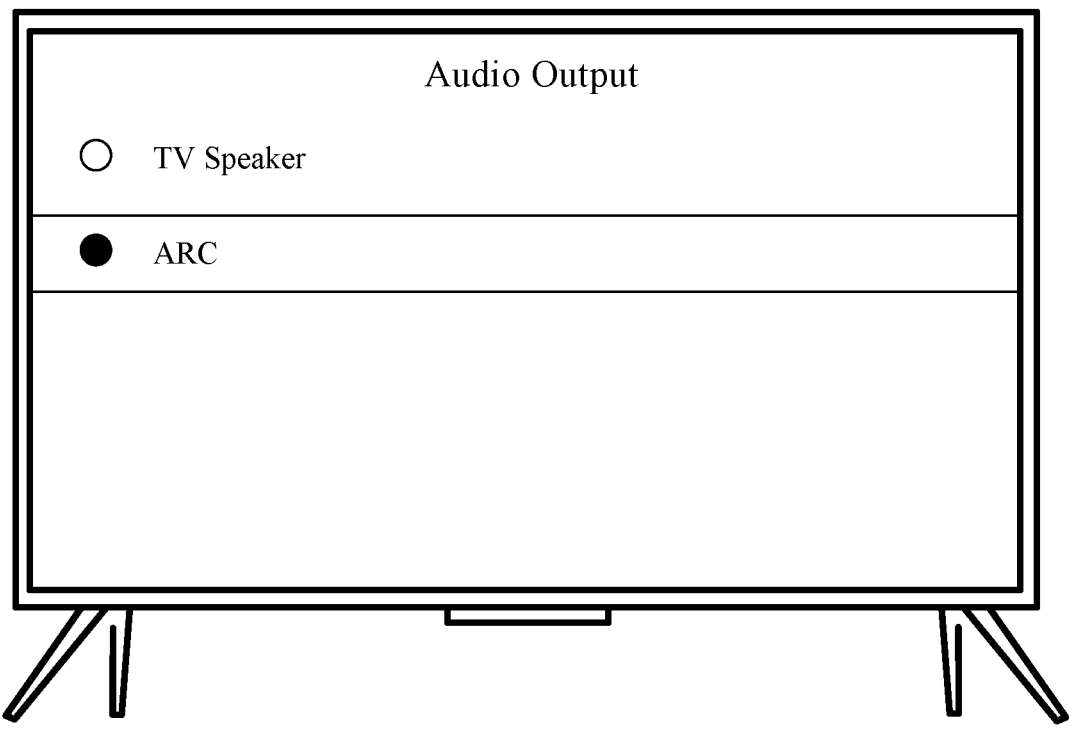
FIG. 5 shows a schematic diagram of a user interface (UI) of an audio output setting page.

In some embodiments, FIG. 5 shows an UI of an audio output setting page. Different types of audio output channels may be displayed on an audio output menu. For example, the audio output channels include, but not limited to, a TV speaker, an ARC, and a Bluetooth. The audio output menu may further mark a current state of each audio output channel (whether it is available for user's selection or not, selectable or non-selectable). A channel in a selectable state may be able to be selected by a user, and is configured as a target channel for outputting audio; and a channel in a non-selectable state may not be selected by a user, and therefore may not be used as a target channel to output audio. In an example shown in FIG. 5, the ARC represents an external power amplifier, but a channel name of the external power amplifier should be synchronized with an actual connection mode of the external power amplifier.

In some embodiments, a TV speaker is an audio output channel arranged in a display apparatus, and is generally in a selectable state by default.

In some embodiments, there is a constraint relation between whether an external power amplifier is selectable and on-off state of a CEC. If a CEC function is in the on state, whether an intersection of condition A∩ condition B is determined. The condition A is that the external power amplifier is detected in a connection state with the display apparatus via the CEC function, the condition B is that the external power amplifier is connected to a target port, and the target port is an ARC port and/or an eARC port of the display apparatus. The condition A is to detect whether the external power amplifier is online, and may detect the external power amplifier by obtaining device information of the external power amplifier via the CEC; and the condition B determines whether the external power amplifier is connected to the ARC port and/or eARC port. For example, a physical address of the external power amplifier is read and shifted rightwards by 12 bits, and then the physical address is compared with an address of the target port. If the physical address of the external power amplifier matches the address of the target port, it indicates that the external power amplifier is connected to the target port in place. The external power amplifier in an Audio output menu is in a selectable state when A∩B is satisfied, that is, both the condition A and the condition B are met; and if $\overline{A \cup B}$ is established, that is, when at least one of the condition A and the condition B is not satisfied, the external power amplifier in the Audio output menu is set to a non-selectable state.

In some embodiments, on-off state of a CEC function may be configured by a user. If the CEC function is switched off, a display apparatus may not detect whether an external power amplifier is connected via a CEC protocol. In this case, the external power amplifier in an Audio output menu is set to a selectable state by default in the present application, so as to be compatible with an external power amplifier that only supports the eARC mode, which is because the eARC mode does not relies on the CEC, and the eARC mode may still be maintained when the CEC function is switched off. The design manner takes into account automatic identification of ARC and technical implementation of the eARC independent without relying on the CEC function.

Figure 6:
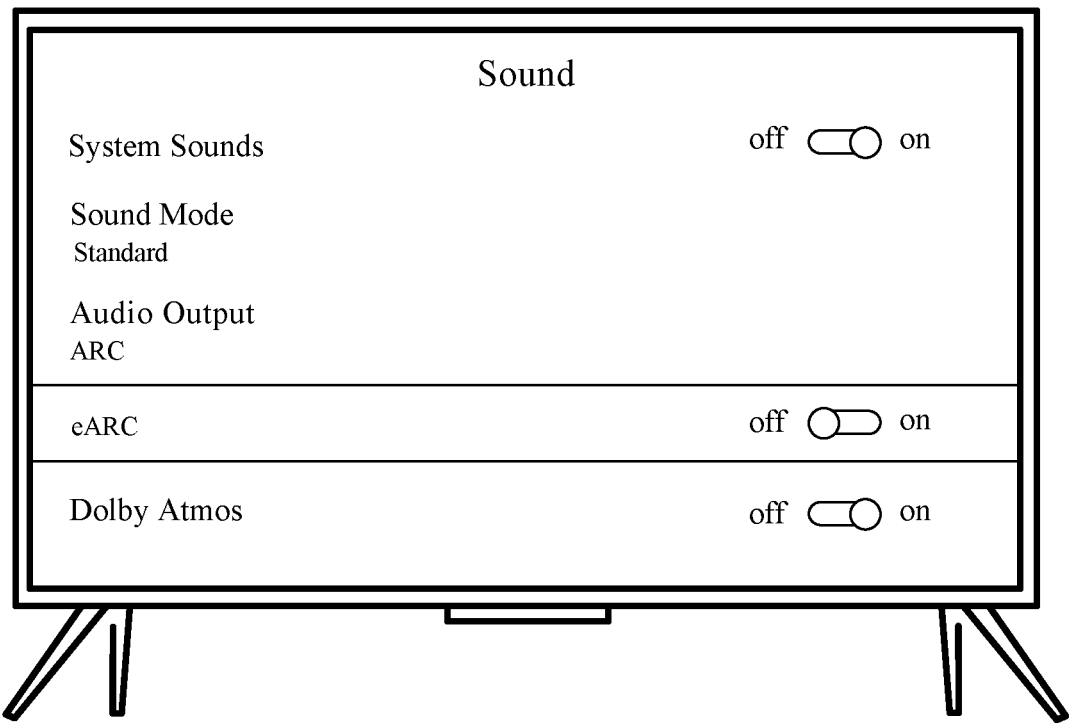
FIG. 6 shows a schematic diagram of a user interface (UI) for switching on-off state of an enhanced audio return channel (eARC) in a sound setting page.

In some embodiments, only when an external power amplifier channel in an Audio output menu is in a selectable state and the external power amplifier is already selected by a user, bidirectional switching between the ARC and the eARC may further be carried out. FIG. 6 shows a sound setting page. In the sound setting page, a target channel of current output audio for the display apparatus is displayed as the ARC (i.e., external power amplifier), and a switch control of the eARC is displayed. By setting on-off state of the switch control for the eARC, the on-off state for the eARC may be adjusted.

In some embodiments, if the external power amplifier supports both the eARC mode and the ARC mode, and the ARC mode currently runs, after a user enters a sound settings page, a switch control for switching to the eARC is in the off state, and the user may switch the switch control for switching the eARC to the on state, such that an audio output channel is switched from the ARC mode to the eARC mode. On the contrary, if the eARC mode currently runs, after the user enters the sound setting page, a target channel is displayed as the eARC, the switch control for switching to the eARC mode is in the on state, and the user may set the switch control for switching to the eARC to the off state, such that the audio output channel is switched from the eARC mode to the ARC mode.

In some embodiments, if an external power amplifier only supports the ARC mode and does not support the eARC mode, after a user enters a sound setting page, a target channel is displayed as the ARC, and a switch control for switching to the eARC is in the off state. Even if a user inputs a command to set on the switch control for switching to the eARC to on state, a display apparatus detects that the external power amplifier does not support the eARC mode, and may not change the on-off state of the switch control for switching to the eARC mode. That is, the display apparatus may not switch a working mode of the external power amplifier, and still maintains the current ARC mode unchanged.

In some embodiments, if an external power amplifier only supports the eARC mode and does not support the ARC mode, after a user enters a sound setting page, a target channel is displayed as the eARC, and a switch control for switching to the eARC is synchronized to the on state. If the user switches the switch control for switching to the eARC to the off state, the eARC mode of the external power amplifier is exited, and the target channel configured to output audio may be automatically switched to a TV speaker, or the user may return to an Audio output menu, and reselect the target channel to output audio.

Figure 7:
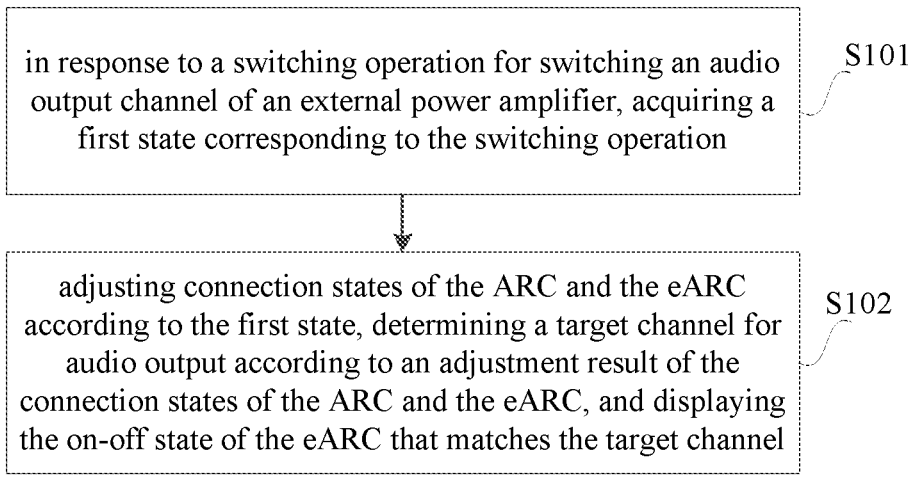
FIG. 7 shows a flowchart of a switching method for an audio output channel.

In some embodiments, after a user selects to output audio by an external power amplifier on the audio output setting page shown in FIG. 5, if the on-off operation is executed on a switch control for switching to the eARC on the sound setting page shown in FIG. 6, switching logic of the ARC and the eARC may be triggered. FIG. 7 provides a switching method for an audio output channel. The method can be performed by a processor 250. The method includes the following process:

S101, in response to a switching operation for switching an audio output channel of an external power amplifier, acquiring a first state corresponding to the switching operation, the first state is configured to indicate on-off state of the eARC that is designated by the switching operation.

The switching operation in step S101 refers to an operation of change the on-off state of a switch control for switching to the eARC, and includes two states: the first is to switch the eARC from the off state to the on state, and the other is to switch the eARC from the on state to the off state. The first state has two state values, one state value is on and the other state value is off.

In some embodiments, if a switching operation is to switch the eARC from the off state to the on state, that is, if a user expects to turn on eARC mode, a first state is recorded as on; and if the switching operation is to switch the eARC from the on state to the off state, the first state is recorded as off. It should be noted that a marking form of the first state is not limited to the description in the embodiments.

S102, adjusting connection states of the ARC and the eARC according to the first state, determining a target channel for audio output according to an adjustment result of the connection states of the ARC and the eARC, and displaying the on-off state of the eARC that matches the target channel.

The scheme in FIG. 5 is an overall summary of switching control logic of an audio output channel. In more detail, with reference to the first state in different scenarios in step S101, the switching logic in S102 is divided into switching logic I and switching logic II accordingly.

Figure 8:
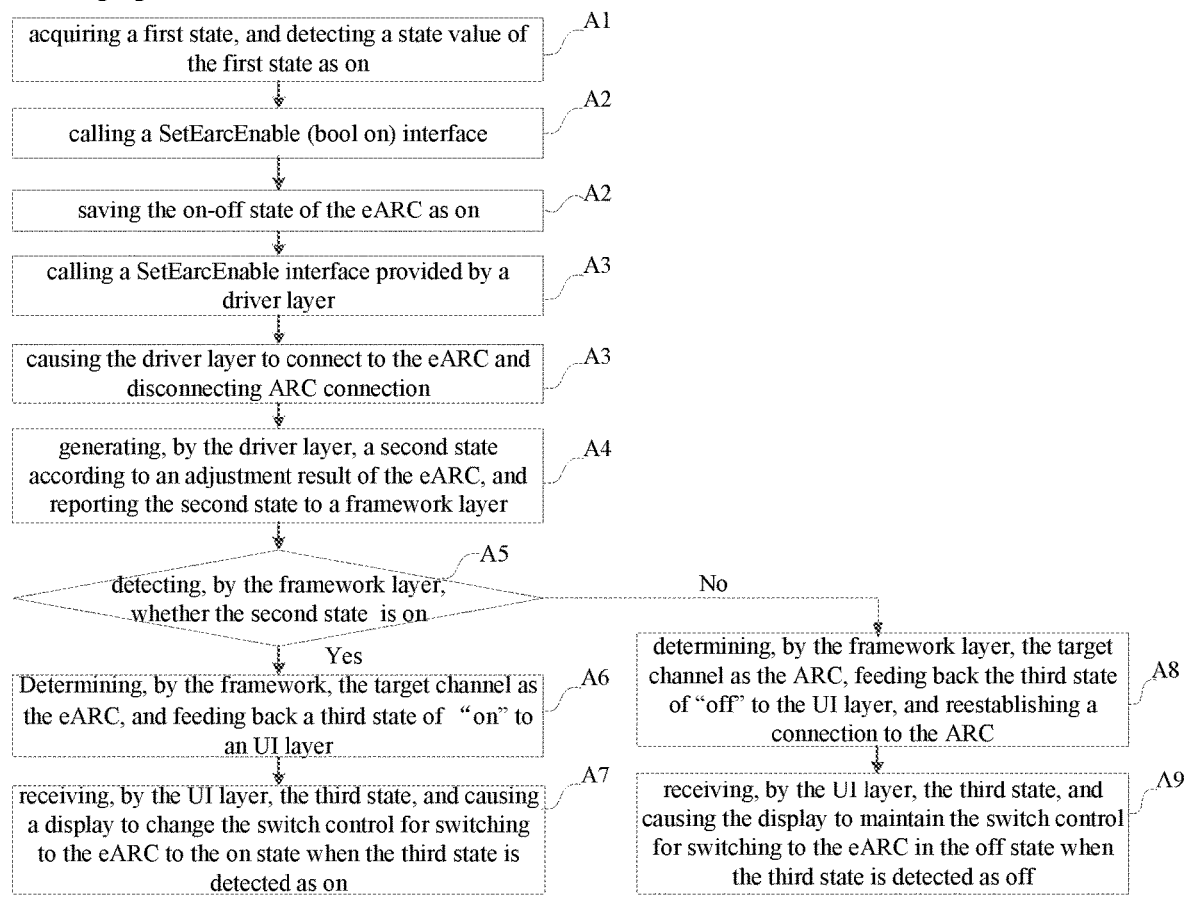
FIG. 8 shows switching logic I when the eARC is switched from off state to on state.

FIG. 8 illustrates switching logic I corresponding to a first state being on. The switching logic I includes the following steps.

Step (A1), acquiring a first state, and detecting a state value of the first state as on.

Step (A2), calling a SetEarcEnable (bool on) interface, and saving the on-off state of the eARC as on.

Step (A3), calling a SetEarcEnable interface provided by a driver layer, causing the driver layer to connect to the eARC and disconnecting ARC connection; the driver layer initiates eARC handshake with an external power amplifier to connect to the eARC, so as to cause the eARC in an enabled state, and disconnect the ARC connection to cause the ARC in a disabled state, the step is mainly to adjust the connection states of the eARC and the ARC according to an indication of state value of the first state.

Step (A4), generating, by the driver layer, a second state according to an adjustment result of the eARC, and reporting the second state to a framework layer, so as to make the framework layer execute a channel switching control logic as shown below. In some embodiments, if the driver layer is successfully connected to and enables the eARC, the second state is fed back as on, and if some abnormal situations occur, for example, a connection of the driver layer to the eARC fails or times out, or it is detected that an external power amplifier does not support the eARC mode when trying to connect the eARC, the second state is fed back as off.

Step (A5), detecting, by the framework layer, whether the second state is on; if the second state is on, the flow goes to step (A6); and if the second state is off, the flow goes to step (A8).

Step (A6), determining, by the framework layer, the target channel as the eARC, and feeding back, by the framework layer, a third state of "on" to an UI layer. The third state is configured to indicate on-off state of a switch control for switching to the eARC displayed on the UI layer.

Step (A7), receiving, by the UI layer, the third state, and causing, by the UI layer, a display to change the switch control for switching to the eARC to the on state when the third state is detected as on; in some embodiments, when the UI layer detects the third state being on, a name of a target channel of currently output audio in an Audio output menu and a sound setting page may also be synchronously changed to the eARC, so as to switch from the ARC mode to the eARC mode.

Step (A8), determining, by the framework layer, the target channel as the ARC, feeding back the third state of "off" to the UI layer, and reestablishing, by the framework layer, a connection to the ARC.

Step (A9), receiving, by the UI layer, the third state, and causing, by the UI layer, the display to maintain the switch control for switching to the eARC in the off state when the third state is detected as off.

When a connection of the driver layer to the eARC fails or times out, or it is detected that the external power amplifier does not support the eARC mode, the display apparatus may not play audio via the eARC channel, and therefore ARC handshake is restarted to establish and enable the connection to the ARC. In the UI layer, the switch control for switching to the eARC is still maintained in the off state, which may not be changed due to an operation of the user to turn on the eARC, and likewise, the switch control for switching to the eARC is not responded, such that the situation that the switch control for switching to the eARC is displayed as the on state is avoided. However, the eARC is not successfully connected (i.e., a false connection), and in this case, the ARC mode is used to output audio. That is, a channel mode of the external power amplifier is not switched. The driver layer, the framework layer and the UI layer involved in the present application are all controlled by a processor 250, and the processor 250 implements a switching process of an audio output channel by coordinating and controlling program execution between the layers.

Figure 9:
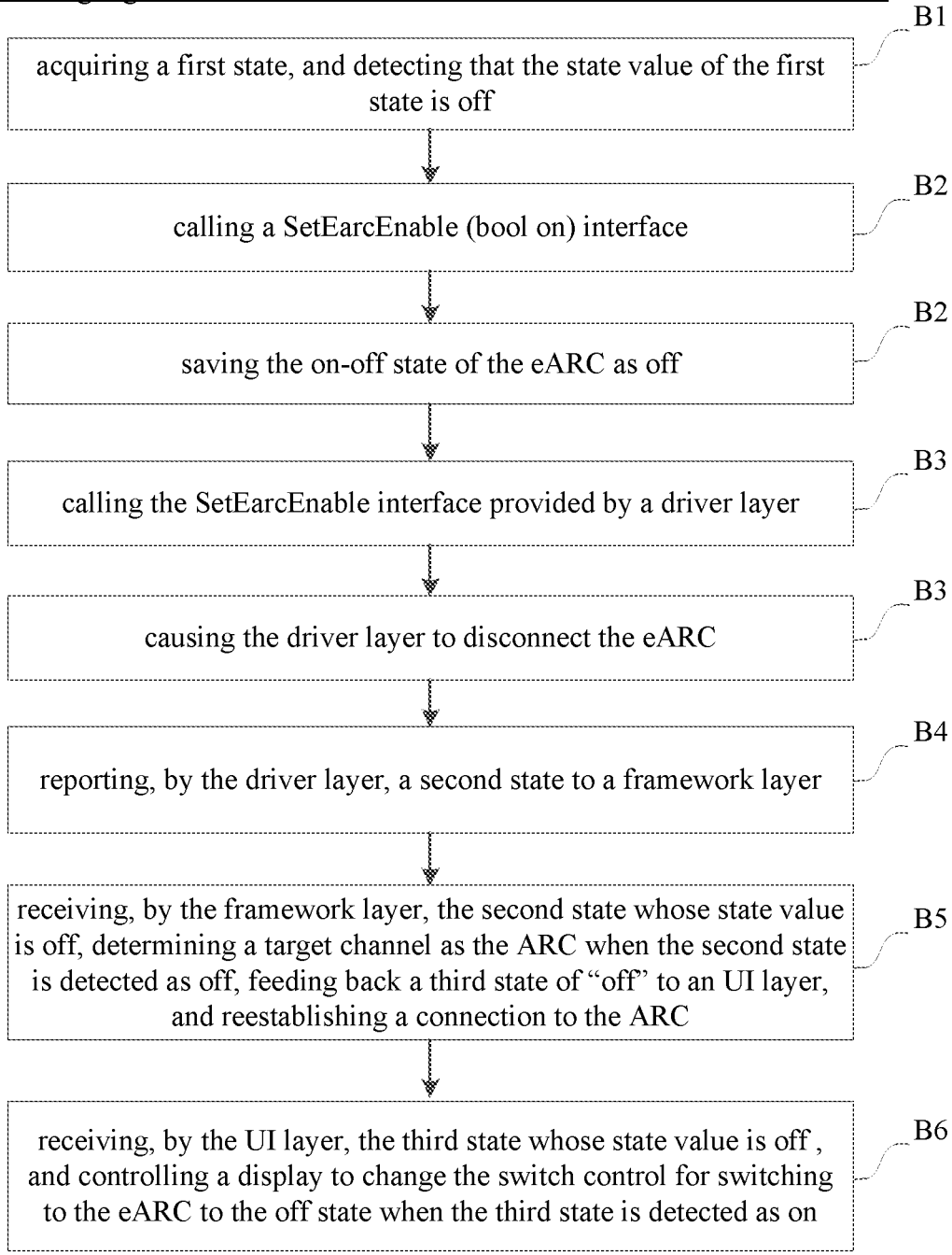
FIG. 9 shows switching logic II when the eARC is switched from on state to off state.

FIG. 9 illustrates switching logic II corresponding to a first state being off. The switching logic II includes the following steps.

Step (B1), acquiring a first state, and detecting that the state value of the first state is off.

Step (B2), calling a SetEarcEnable (bool on) interface, and saving the on-off state of the eARC as off.

Step (B3), calling the SetEarcEnable interface provided by a driver layer, and causing the driver layer to disconnect the eARC, i.e., exit the eARC mode of an external power amplifier.

Step (B4), reporting, by the driver layer, a second state to a framework layer, to make the framework layer execute a channel switching control logic as shown in step (B5) below, the second state in the switching logic II is off.

Step (B5), receiving, by the framework layer, the second state whose state value is off, determining, by the framework layer, a target channel as the ARC when the second state is detected as off, feeding back, by the framework layer, a third state of "off" to an UI layer, and reestablishing a connection to the ARC. The third state is configured to indicate the on-off state of the switch control for switching to the eARC displayed on the UI layer.

Step (B6), receiving, by the UI layer, the third state whose state value is off, and controlling, by the UI layer, a display to change the switch control for switching to the eARC to the off state when the third state is detected as on. In some embodiments, when the UI layer detects the third state as off, a name of a target channel of currently output audio in an Audio output menu and a sound setting page may also be synchronously changed to the ARC, so as to switch from the eARC mode to the ARC mode.

The above embodiments are implementations when the CEC function is in a default on state. In practical applications, the user may operate the switch control of the CEC in the setting menu to control the on-off state of the CEC function. When the switch control of the CEC is switched from on state to off state, that is, the CEC function is switched from the on state to the off state, sound of the external power amplifier is instantaneously interrupted for a moment. After the CEC is switched off, the user may not be able to adjust the volume via the remote controller in the eARC mode. However, there is no reminder for the abnormal condition. If the user does not use the remote controller to adjust the volume, the user may not perceive the abnormal condition. When the user operates the remote controller, the user does not know the reason why volume adjustment of the external device can not be achieved, resulting in poor user experience.

Figure 10:
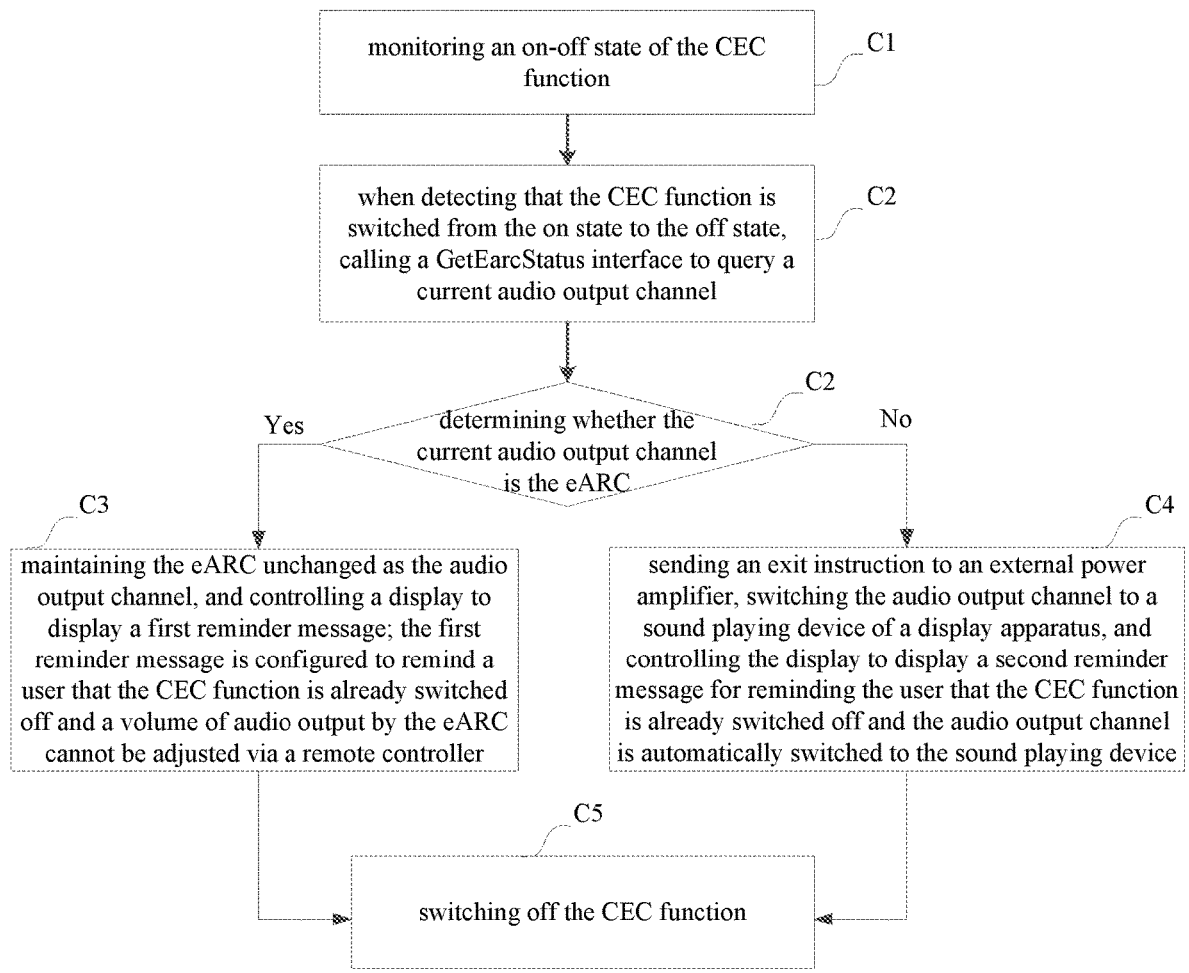
FIG. 10 shows switching logic III when a consumer electronics control (CEC) function is switched from an on state to an off state.

To this regard, in some embodiments, FIG. 10 shows switching logic III when a CEC function is switched off. The switching logic III includes the following steps.

Step (C1): monitoring an on-off state of the CEC function.

Step (C2): when detecting that the CEC function is switched from the on state to the off state, calling a GetEarcStatus interface to query a current audio output channel, and determining whether the current audio output channel is the eARC; and if the current audio output channel is the eARC, the flow goes to step (C3), and if the current audio output channel is the ARC, the flow goes to step (C4).

Step (C3), maintaining the eARC unchanged as the audio output channel, and controlling a display to display a first reminder message; the first reminder message is configured to remind a user that the CEC function is already switched off and a volume of audio output by the eARC cannot be adjusted via a remote controller.

Since the eARC mode does not rely on a CEC function, the CEC function is switched off when an external power amplifier is in the eARC mode, the audio output channel does not need to be switched, and the audio is still output via the eARC channel. However, the user needs to be reminded that the remote controller may not be operated to adjust the volume of the external power amplifier since the CEC function is switched off. A volume adjustment operation includes mute, volume up and volume down. After viewing the first reminder message, the user may know the reason why the volume of the external power amplifier is not available for adjustment via the remote controller, such that adjusting the volume via the remote controller may be restored by switching the audio output channel or restarting the CEC function.

Step (C4), sending an exit instruction to an external power amplifier, switching the audio output channel to a sound playing device of a display apparatus, and controlling the display to display a second reminder message for reminding the user that the CEC function is already switched off and the audio output channel is automatically switched to the sound playing device; the exit instruction is configured to instruct the external power amplifier to exit the ARC work mode.

In some embodiments, in step (C4), a CEC switching-off message needs to be broadcast while the exit instruction is sent, and an underlying Audio device management module of the display apparatus automatically switches the audio output channel to a TV speaker in response to receiving the CEC switching-off message; and in step (C3), since the audio output channel is not switched but is maintained as the eARC, the CEC switching-off message does not need to be broadcast, and the audio output channel is not switched if the Audio device management module does not receive the CEC switching-off message.

Step (C5), switching off the CEC function. After step (C3) or step (C4) is completed, the CEC function may be switched off and CEC related data may be cleared.

Since the ARC mode relies on the CEC, the CEC function is switched off when the external power amplifier is in the ARC mode, the ARC mode is not available, and the display apparatus may send the exit instruction to notify the external power amplifier to exit the ARC mode, so as to disconnect the ARC. Moreover, the display apparatus automatically switches the audio output channel to the TV speaker. That is, the display apparatus switches the audio output channel to the TV speaker to play the audio, so the audio output problem (for example, sound interruption for a short period of time) due to the switching-off of the CEC is avoided, and the user is reminded that the CEC is already switched off, so as to automatically switch the audio output channel to the TV speaker. After viewing the second reminder message, the user may know the reason for switching the audio output channel, and may continue to use the TV speaker to play audio, or restart the CEC function, and switch the audio output channel to the ARC or eARC of the external power amplifier to output audio.

The present application mainly focuses on how to perform switching between the ARC mode and the eARC mode when the user selects the external power amplifier to output audio in an Audio output menu, and provides the switching logic I and the switching logic II according to a switching direction, thereby improving accuracy of switching between the ARC mode and the eARC mode. Moreover, no matter whether switching between the ARC mode and the eARC mode succeeds, a target channel can be matched to output audio, thereby avoiding the situation that the external power amplifier and the display apparatus are silent or interrupted due to abnormal mode switching, ensuring effectiveness of audio play, and improving user experience. The present application may be compatible with an external power amplifier that supports both the ARC and the eARC, and may also be compatible with an external power amplifier that only supports the ARC or only supports the eARC.

Since the external power amplifier is affected by the on-off state of the CEC when playing audio in different modes, the switching logic III when the CEC function is switched from on to off is provided. It should be noted that based on the switching logic discussed in the present application, a wide range of switching logics may be adaptively extended on the basis of working mechanisms of the HDMI, the CEC, the ARC and the eARC. Other contents of the HDMI, the CEC, the ARC and the eARC may refer to the related prior art, which will not be repeated in the present application.

The embodiments of the present application provide a display apparatus. The display apparatus includes: a display configured to display an image from broadcast system or network and/or a user interface; one or more HDMI ports configured to be connected with one or more external devices; a memory configured to store computer instructions associated with the operating system and for controlling various aspects of the display apparatus, a processor in connection with the display, the HDMI port and the memory and configured to execute the computer instructions to cause the display apparatus to: in response to a start instruction of the display apparatus, acquire a drive source for causing the display apparatus to start; send a target device request to an external device in response to the drive source being the HDMI; the target device request is configured to request a first external device currently in an active state from one or more external devices; upon receiving a response message as a reply to the target device request from the first external device, switch a video source to a signal source that corresponding to the response message; and cause a display to display a start interface based on data output from the video source upon completion of the start of the display apparatus.

In some embodiments of the present application, after acquiring the drive source, the processor is further configured to execute the computer instructions to cause the display apparatus to: in response to the drive source being not HDMI, configure the display apparatus as a target device, and not switch a video source to maintain the video source as a TV source; and control a display to present a home interface upon completion of the start of the display apparatus.

In some embodiments of the present application, after sending the target device request to the external device, the processor is further configured to execute the computer instructions to cause the display apparatus to: in response to no response message from one or more external devices being received in preset time, resend the target device request and add 1 to the accumulated number of times of resending; and in response to the number of times of resending exceeds a threshold, configure the display apparatus as the target device and not switch a video source to maintain the video source as the TV source and cause a display to present the home interface upon completion of the start of the display apparatus.

In some embodiments of the present application, the processor is further configured to execute the computer instructions to cause the display apparatus to: in response to the start instruction of the display apparatus, cause Android system of the display apparatus and a system service to start; set and save a start attribute field of the Android system according to a drive source obtained from a driver layer of the display apparatus; load an HDMI control service, allocate a logical address, and then call a LaunchRoutingControl interface; and control the LaunchRoutingControl interface to read the start attribute field, to detect a type of the drive source.

In some embodiments of the present application, after sending a target device request to an external device, the processor is further configured to execute the computer instructions to cause the display apparatus to: in response to a feature abort message from one or more external devices being received in preset time, configure the display apparatus as the target device, and not switch a video source to maintain a video source as the TV source; and cause a display to present the home interface upon completion of the start of the display apparatus.

In some embodiments of the present application, the response message includes a port parameter of the HDMI port connected with the first external device. In some embodiments, the first external device, which sends the response message to the display apparatus as a reply to the target device request, is the target device.

The embodiments of the present application provide a method for controlling a start interface of a display apparatus. The method includes: in response to a start instruction of the display apparatus, acquiring a drive source for causing the display apparatus to start; sending a target device request to one or more external devices in response to the drive source being HDMI; the target device request is configured to request a first external device currently in an active state from one or more external devices, and the one or more external devices are in connection with the display apparatus via one or more HDMI ports; in response to a response message as a reply to the target device request from a first external device being received, switching a video source to a signal source that corresponding to the response message; and displaying a start interface according to data output from the video source upon completion of the start of the display apparatus.

In some embodiments of the present application, after the acquiring the drive source, the method further includes: in response to the drive source being not HDMI, configuring the display apparatus as a target device, and not switching the video source to maintain the video source as a TV source; and displaying a home interface upon completion of the start of the display apparatus.

In some embodiments of the present application, after the sending the target device request to the external device, the method further includes: in response no response message from the one or more external devices being received in preset time, resending the target device request and adding 1 to a accumulated number of times of resending; configuring the target device as the display apparatus and not switching the video source to maintain the video source as the TV source in response to the number of times of resending exceeding a threshold; and displaying the home interface upon the completion of the start of the display apparatus.

In some embodiments of the present application, the method further includes: in response to the start instruction of the display apparatus, controlling Android system and a system service of the display apparatus to start; setting and saving a start attribute field of the Android system according to a drive source acquired from a driver layer of the display apparatus; loading an HDMI control service, allocating a logical address, and then calling a LaunchRoutingControl interface; and controlling the LaunchRoutingControl interface to read the start attribute field, to detect a type of the drive source.

In some scenarios, several HDMI interfaces are generally provided on the display apparatus, and may be connected with an external device via HDMI ports. The external device includes a video signal source device such as a digital video disk (DVD) device and a set-top box, and a video signal of the external device is transmitted to Android system via the HDMI port, and a system processor controls a display to display the video signal. Taking the external device being the DVD as an example, if the DVD has enabled a CEC function, when the user starts the DVD, the DVD sends a CEC wake-up signal to the display apparatus according to HDMI protocol, such that the display apparatus is automatically started after receiving a notice of the CEC wake-up signal, and waking up the display apparatus to automatically start via the external device is an important node in the CEC function.

Figure 11:
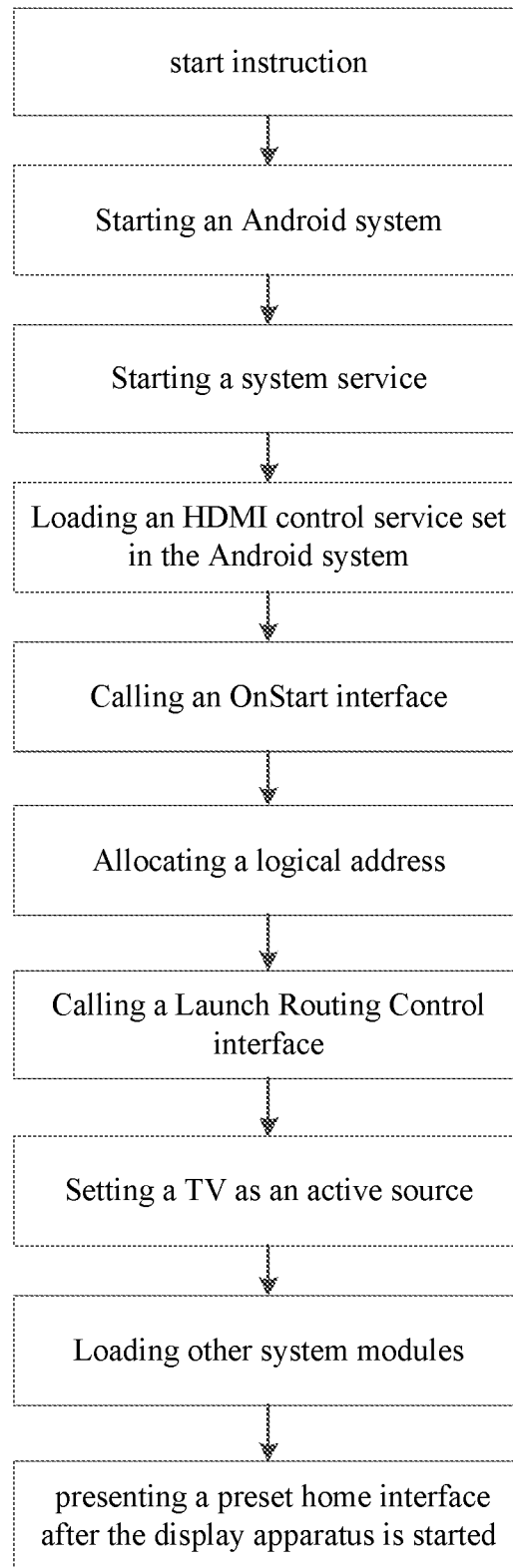
FIG. 11 shows a flowchart of a starting procedure executed by a native architecture of Android system.

In some embodiments, FIG. 11 shows a flow of a starting process under a native architecture of the Android system. When the display apparatus is in a standby state, if a CEC wake-up signal transmitted according to HDMI protocol is received, or a selection operation on a power key of a remote controller is received, or a press operation on a switch key of the display apparatus is received, that is, a start instruction is received, the Android system is started. After the Android system is started, a system service is started, then a CEC related service set in the Android system, i.e., an HDMI service, is loaded, and then a startup interface OnStart of an HDMI control service is called to allocate a logical address; and after the logical address is allocated, a LaunchRoutingControl interface is called. Native structure of the Android system neither learn a factor for triggering the start instruction (for example, a trigger factor for starting the display apparatus, such as an external device via CEC function or a power key on the remote control), nor acquire an active source currently in an active state on a CEC bus. Instead, a TV is directly set as the active source by default via LaunchRoutingControl. Subsequently, after other system modules are loaded, the display apparatus queries that the current active source is the TV Since a start interface corresponding to the TV is a launcher interface, the start interface displayed after the display apparatus is started is a preset homepage interface.

Thus, it may be seen that since the native architecture of the Android system does not consider controlling display of the start interface according to a trigger factor for starting the display apparatus and the current actual active source, but automatically set the active source to the TV as default, the start interface is always the homepage. If the user wakes up the TV to start by starting the DVD, it is expected that the TV displays a relevant interface of the DVD after being started, such that the Android TV may not provide an excellent CEC service for the user.

With reference to an HDMI-CEC technology, a CEC bus is connected to the display apparatus (i.e., a root device) and at least one external device, query and communication between the devices are controlled via the CEC bus. Generally, only one external device on the CEC bus is in an active state, and the external device is the current active source. After the display apparatus sends a request active source, the active source receives the request and responds, and the display apparatus may acquire the active source. In view of the problems and defects in the native architecture of the Android system, in the present application, a program for determining a trigger factor for starting the display apparatus and an active source is added in a starting stage of the display apparatus. A signal source corresponding to the actual active source is adaptively matched according to the trigger factor and the active source, a signal output of the video source is changed by switching the video source to the corresponding signal source, and display of the start interface is further adjusted, such that the start interface conforms to an expectation of the user, thereby improving experience of the user.

Figure 12:
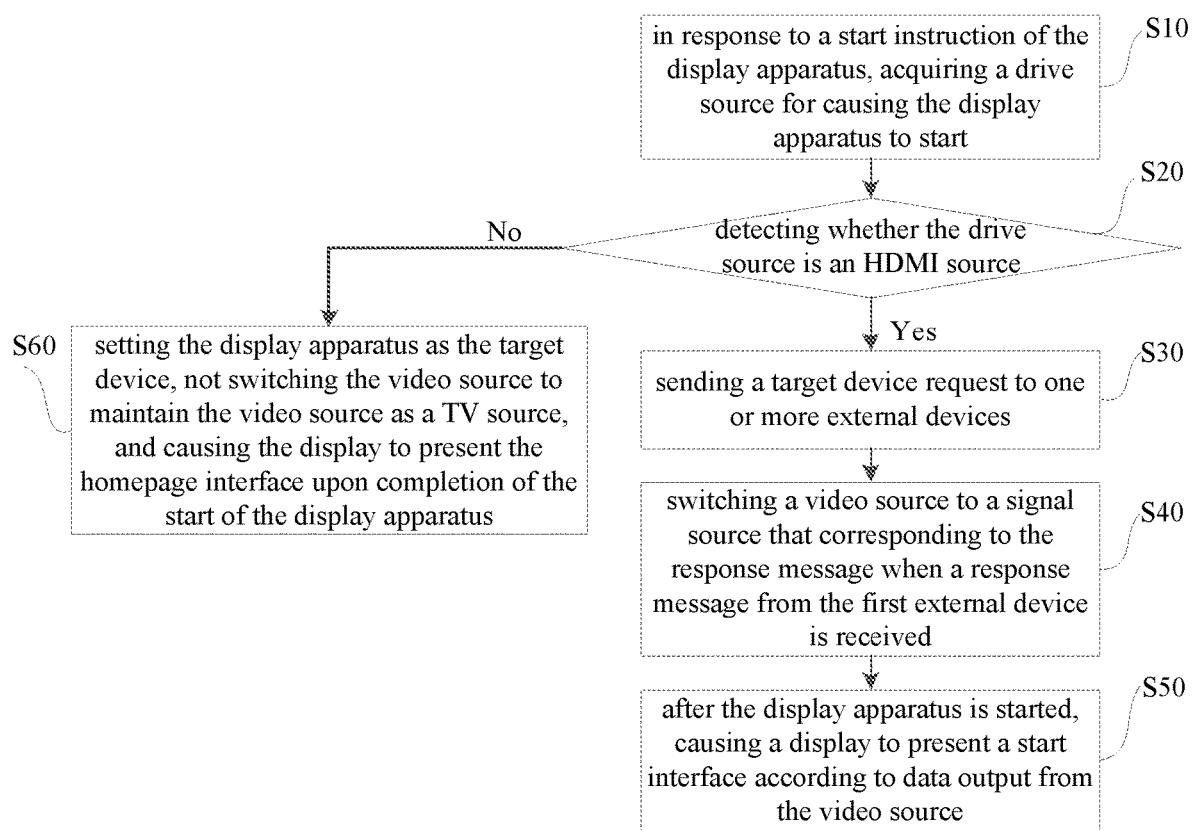
FIG. 12 shows a flowchart of a control method for a starting interface.

In some embodiments, FIG. 12 shows a method for controlling a start interface. The method is a processor 250 of a display apparatus. The method includes:

S10, in response to a start instruction of the display apparatus, acquiring a drive source for causing the display apparatus to start.

The drive source described herein is a transmission source of the start instruction. For example, if an external device sends a CEC wake-up instruction to the display apparatus according to an HDMI protocol, the drive source is the HDMI source; if a user sends the start instruction to the display apparatus by pressing a power key of a remote controller, the drive source is the remote controller; and if the user inputs a start instruction by pressing a switch key of the display apparatus, the drive source is the switch key of the display apparatus. The drive source of the start instruction input from the remote controller and the switch key of the display apparatus belongs to a non-HDMI source.

In S20, detecting whether the drive source is an HDMI source. If the drive source is the HDMI, the flow goes to S30-S50, and otherwise, if the drive source is not the HDMI source, the flow goes to S60.

S30, sending a target device request to one or more external devices. The target device request is configured to request a first external device currently in an active state from the one or more external devices. The target device request described herein is a request for an active source, and the first external device is an active source currently in the active state on a CEC bus. The first external device in active state is a target device for the display apparatus when it is determined that the drive source is the HDMI source.

S40, switching a video source to a signal source that corresponding to the response message when a response message from the first external device is received.

In some embodiments, the response message includes a physical address of an active source device, and the physical address is, for example, a port parameter of the HDMI connected to the active source. For example, after the active source responds to the request for active source, a response message fed back is <Active Source>BF: 0x82:30:00. An <Active Source> message is generated by triggering the request for active source, B represents a logical address of the active source, F represents broadcast, 0x82 represents an operation code Opcode, and 30:00 represents a port number of the HDMI connected to the active source device, and indicates that the active source is connected to an HDMI3 port.

In some embodiments, an underlying source management module registers InputChangeListener to a CEC module during a start stage of a display apparatus, the CEC module subsequently calls an invokeInputChangeListener interface when receiving a response message <Active Source>, to transmit a port number carried in the response message as a parameter to the source management module, and the source management module completes switching of a video source, such that the video source is switched to a signal source of a device connected to an HDMI port corresponding to the port parameter, and after switching to the signal source, data of signal source is changed. A start interface displayed after the display apparatus is started is no longer a homepage interface, but a video signal output from an active signal source.

S50, after the display apparatus is started, causing a display to present a start interface according to data output from the video source.

Since source switching of the video source is already completed in S40 and the signal source is adjusted to a signal source of the active source, data output from the signal source is a video signal from the current actual active source, the start interface is no longer a homepage, and the start interface may accurately match the external active source, thereby improving accuracy of displaying the start interface.

Step S60, setting the display apparatus as the target device, not switching the video source to maintain the video source as a TV source, and causing the display to present the homepage interface upon completion of the start of the display apparatus.

In S60, when the drive source is not the HDMI source, it indicates that a trigger factor for starting the display apparatus is not a CEC wake-up signal sent from an external device, and therefore it is unnecessary to identify the active source from the external device, but the display apparatus (i.e., TV) is directly set as the active source, and the preset homepage interface is displayed after the display apparatus is started.

In some embodiments, after receiving a request for an active source, an active source generally returns a response message in preset time. The preset time is, for example, 2 seconds. After a display apparatus sends the request for an active source, a timer is started to perform timing monitor on the response message, time set by the timer is the preset time, and if the display apparatus receives the response message in the preset time, the response message is analyzed, and a source is switched according to parameters carried in the response message. The preset time may be specifically set according to needs.

In some embodiments, if a display apparatus does not receive a response message in preset time, it is deemed that a response times out, and a retry mechanism may be started. That is, a request for an active source is resent anew. The number of times of resending needs to be counted and recorded under the retry mechanism, and the accumulated number of times of resending is added by 1 for each resending of the request for an active source, and whether the number of times of resending exceeds a threshold is detected. For example, the threshold is 2 times. If the number of times of resending is less than or equal to the threshold, loop retry is allowed to continue. However, if the number of times of resending exceeds an upper limit of the threshold and the display apparatus still does not receive the response message, it is deemed that there is no active source in the current external device, execution of the retry mechanism needs to be forcibly terminated, and step S60 is executed to set the TV as the active source, the source is not switched, and the display apparatus displays the homepage interface upon completion of the start of the display apparatus. By the retry mechanism, the situation that missing of receipt of the response message due to response timeout is avoided, and by setting a threshold restriction during retry process, repeatedly retry flow may be avoided. The threshold may be set according to needs.

In some embodiments, a display apparatus receives a message in preset time, but the message may not be the response message, but a feature abort message. For example, when an active source may not immediately process a request for an active source, or when an abnormal situation such as an error occurs in high-level protocol layer data during message transmission, the active source returns a feature abort message to the display apparatus. If the display apparatus receives the feature abort message in the preset time, the flow goes to S60 to set the TV as the active source, a video source is not switched, and the display apparatus displays the homepage interface upon completion of the start procedure.

Figure 13:
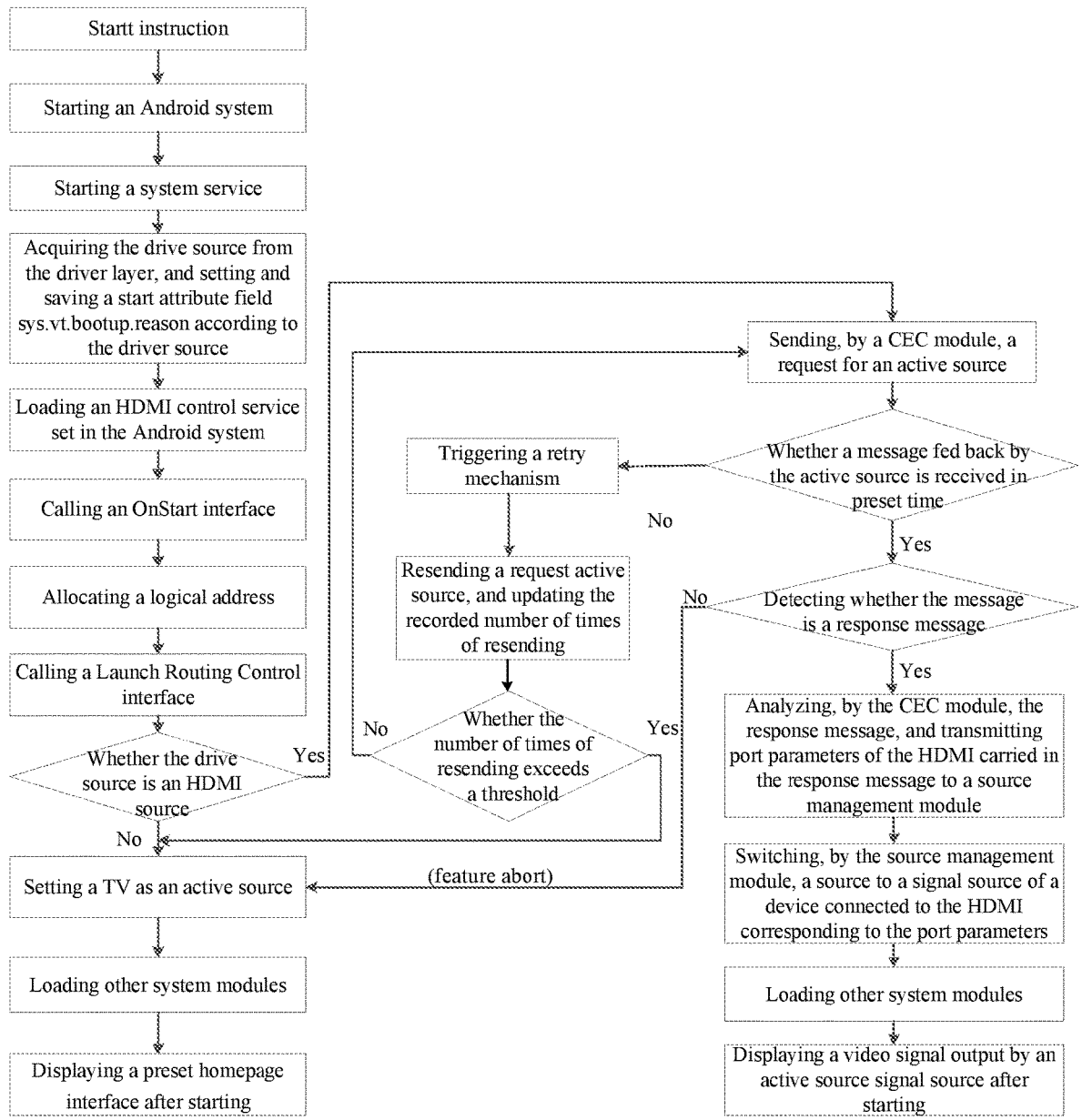
FIG. 13 shows a flowchart of a starting procedure executed after an architecture of the Android system is improved.

In some embodiments, FIG. 13 shows a flow of a start process after architecture of the Android system is improved.

When the display apparatus receives a start instruction, Android system and a system service are started in order, and then a drive source is acquired from a driver layer, and a start attribute field of the Android system is set and stored according to the drive source. The start attribute field is, for example, configured in a format of sys.vt.bootup.reason, where "reason" is a trigger factor for starting the display apparatus indicated by the drive source. The display apparatus needs to store the current boot or start attribute field each time the display apparatus is started. A type of the drive source may be detected by reading the reason in start attribute field, to learn the trigger factor for starting the display apparatus, such that whether it is necessary to switch to an external active signal source may be determined.

When a system service is started, an HDMI control service is loaded to call an OnStart interface, and the OnStart interface is responsible for allocating a logical address; and after the logical address is allocated, a LaunchRoutingControl interface is called, and the LaunchRoutingControl reads a reason value in the start attribute field, to identify the type of the drive source, acquire a trigger factor or boot reason, and determine whether the drive source is the HDMI source.

If the drive source is not the HDMI source, LaunchRoutingControl sets the TV as the current Active Source, keeps the video source as the default TV source, does not switch to the signal source of the external device, and displays the preset home interface after the display apparatus is powered on.

If the drive source is the HDMI source, it indicates that the external device connected with the display apparatus via the HDMI source wakes up the Android system to start automatically, and a CEC module sends a request for an active source to request the target device currently in the active state on the CEC bus, the target device in the active state responds to the active source after receiving the request, and the CEC module needs to detect whether a message fed back by the active source is received in preset time.

If the CEC module does not receive the message fed back by the active source in the preset time, the CEC module triggers the retry mechanism to resend the request for an active source anew, updates the recorded number of times of resending, and determines whether the number of times of resending exceeds the threshold. If the number of times of resending does not exceed the threshold, loop retry is allowed until the response message is receive in the preset time after a certain request, such that execution of the retry mechanism is terminated, and the CEC module analyzes the response message, and transmits port parameters of the HDMI carried in the response message to the source management module. The source management module switches a source to the signal source of the device connected with the HDMI corresponding to the port parameters, such that the start interface displayed by the display apparatus after starting is no longer a home interface, but the video signal output from the active signal source.

If the number of times of resending exceeds the threshold, and the CEC module still does not receive the response message, execution of the retry mechanism is terminated, the TV is set as the current active source by the LaunchRoutingControl, the video source is maintained as the default TV source, and the signal source of the external device is no longer switched, such that the display apparatus displays the preset home interface after starting.

If the CEC module receives the message fed back by the active source in the preset time, whether the message is the response message is detected, and if the response message is received within the preset time, the CEC module analyzes the response message, and transmits the port parameters of the HDMI carried in the response message to the source management module. The source management module switches the source to the signal source of the device connected with the HDMI corresponding to the port parameters, such that the start interface displayed after the display apparatus is started is no longer the home interface, but the video signal output from the active signal source.

If the CEC module does not receive the response message but a message of the feature abort in the preset time, the TV is set as the current active source by the LaunchRoutingControl, the video source is maintained as the default TV source, and the signal source of the external device is no longer switched, such that the display apparatus displays the preset home interface upon completion of starting process.

In the present application, on the basis of the native architecture of the Android system, the trigger factor for starting the display apparatus is additionally queried from the driver layer after the system service is started, the start attribute field of the Android system is set and stored, the reason value in the start attribute field is read after the LaunchRoutingControl interface is called, and the mutually adaptive control logics are executed according to the reason value and a response condition received after the request active source is sent, such that the display apparatus displays a start interface satisfying the expectation of the user after starting, and start time of the Android system is not increased, thereby improving user experience.

For the convenience of explanation, the above explanation has been made in combination with specific embodiments. However, the above discussion is not intended to be exhaustive or to limit the embodiments to the specific forms disclosed above. On the basis of the above teachings, various modifications and variations can be obtained. The selection and description of the above embodiments are to better explain the principles and practical applications, such that those skilled in the art better use the embodiments and various variant embodiments suitable for specific use considerations.

What is claimed is:

1. A display apparatus, comprising:
a display configured to display an image from broadcasting system or network, and/or, a user interface;
one or more high-definition multimedia interface (HDMI) ports configured to connect with one or more external power amplifiers, an audio output channel of an external power amplifier supports an audio return channel (ARC) and/or an enhanced audio return channel (eARC);
a sound playing device configured to play audio;
a memory, configured to store computer instructions and data associated with the display, the one or more HDMI ports and the sound playing device, and
a processor, in connection with the display, the one or more HDMI ports, the sound playing device and the memory and configured to execute the computer instructions to cause the display apparatus to perform:
in response to a switching operation for switching the audio output channel of the external power amplifier, acquiring a first state corresponding to the switching operation, wherein the first state is configured to indicate on-off state of the eARC that is designated by the switching operation; and
adjusting connection states of the ARC and the eARC according to the first state, determining a target channel for audio output according to an adjustment of the connection state of the ARC and the eARC, and displaying the on-off state of the eARC that matches the target channel;

wherein the processor is further configured to execute the computer instructions to cause the display apparatus to perform:
in response to a start instruction of the display apparatus, acquiring a drive source for causing the display apparatus to start, wherein the drive source comprises a CEC wake-up instruction sent from an external device, a key on a remote controller and a switch key on a body of the display apparatus;
in response to the drive source being an HDMI source, sending a target device request to one or more external devices according to an HDMI protocol, wherein the target device request is configured to request a first external device currently in an active state from the one or more external devices;
in response to receiving a response message as a reply to the target device request from the first external device, switching a video source of the display apparatus to a signal source that corresponding to the response message;
displaying a start interface according to data output from the video source upon completion of the start of the display apparatus; and
in response to the drive source being not the HDMI source, configuring the display apparatus as a target device, and not switching the video source to maintain the video source as a TV source; and displaying a home interface upon the completion of the start of the display apparatus.

2. The display apparatus according to claim 1, wherein the processor is further configured to execute the computer instructions to cause the display apparatus to perform:
in response to the switching operation being to switch the eARC from an off state to an on state, recording the first state as on; or,
in response to the switching operation being to switch the eARC from an on state to an off state, recording the first state as off.

3. The display apparatus according to claim 2, wherein the processor is further configured to execute the computer instructions to cause the display apparatus to perform:
in response to the first state being on, causing a driver layer of the display apparatus to connect to the eARC and disconnect from the ARC; and
generating a second state according to connection to the eARC and disconnection from the ARC in the driver layer, and reporting the second state to a framework layer of the display apparatus, to cause the framework layer execute channel switching according to the second state,
wherein the second state is configured to indicate connection or disconnection state of the eARC;
wherein the channel switching is configured to: in response to the second state being on, determine that the target channel is the eARC and control the display to change a switch control for switching to eARC to the on state, wherein the switch control is a control presented on a user interface on the display.

4. The display apparatus according to claim 3, wherein the processor is further configured to execute the computer instructions to cause the display apparatus to perform:
in response to the second state being off, determining that the target channel is the ARC, reestablishing a connection to the ARC, and causing the display to set the switch control for switching to eARC to the off state on the user interface;

wherein the second state is off, in response to a connection failure of the eARC, timing out of a connection of the eARC, or detecting that the external power amplifier does not support the eARC while trying to establish a connection with the eARC.

5. The display apparatus according to claim 2, wherein the processor is further configured to execute the computer instructions to cause the display apparatus to perform:

in response to the first state being off, causing a driver layer of the display apparatus to disconnect from the eARC, generating a second state and reporting the second state to a framework layer of the display apparatus, to cause the framework layer execute channel switching according to the second state, wherein the second state is off, and the channel switching is configured to: in response to the second state being off, determine that the target channel is the ARC, reestablish a connection to the ARC, and control the display to change a switch control for switching to eARC to the off state.

6. The display apparatus according to claim 1, wherein the processor is further configured to execute the computer instructions to cause the display apparatus to perform:

monitoring on-off state of a consumer electronics control (CEC) function;

in response to the CEC function being switched from an on state to an off state, querying a current audio output channel of the display apparatus;

in response to the current audio output channel being the eARC, maintaining the eARC unchanged as the audio output channel and causing the display to present a first reminder message, wherein the first reminder message is configured to remind a user that the CEC function is already switched off and a volume of the audio output by the eARC is not available for adjustment via the remote controller.

7. The display apparatus according to claim 6, wherein the processor is further configured to execute the computer instructions to cause the display apparatus to perform:

in response to the CEC function being switched from the on state to the off state and the current audio output channel being the ARC, sending an exit instruction to the external power amplifier, to switch the audio output channel to the sound playing device of the display apparatus and causing the display to present a second reminder message;

wherein the second reminder message is configured to remind the user that the CEC function is already switched off and the audio output channel is already automatically switched to the sound playing device, and the exit instruction is configured to instruct the external power amplifier to exit an ARC mode.

8. The display apparatus according to claim 1, wherein the response message comprises a physical address of an active source device.

9. A method for a display apparatus, comprising:

in response to a switching operation for switching the audio output channel of an external power amplifier, acquiring a first state corresponding to the switching operation, wherein the first state is configured to indicate on-off state of the eARC that is designated by the switching operation, the external power amplifier is connected to the display apparatus via an HDMI, and the audio output channel of the external power amplifier supports an ARC and/or an eARC;

adjusting a connection state of the ARC and the eARC according to the first state; and determining a target channel for audio output according to an adjustment of the connection state of the ARC and the eARC, and displaying the on-off state of the eARC that matches the target channel;

in response to a start instruction of the display apparatus, acquiring a drive source for causing the display apparatus to start, wherein the drive source comprises a CEC wake-up instruction sent from an external device, a key on a remote controller and a switch key on a body of the display apparatus;

in response to the drive source being an HDMI source, sending a target device request to one or more external devices according to an HDMI protocol, wherein the target device request is configured to request a first external device currently in an active state from the one or more external devices;

in response to receiving a response message as a reply to the target device request from the first external device, switching a video source of the display apparatus to a signal source that corresponding to the response message;

displaying a start interface according to data output from the video source upon completion of the start of the display apparatus; and in response to the drive source being not the HDMI source, configuring the display apparatus as a target device, and not switching the video source to maintain the video source as a TV source; and displaying a home interface upon the completion of the start of the display apparatus.

10. The method according to claim 9, wherein the method further comprises:

in response to the switching operation being to switch the eARC from an off state to an on state, recording the first state as on; or, in response to the switching operation being to switch the eARC from an on state to an off state, recording the first state as off.

11. The method according to claim 10, wherein the method further comprises:

in response to the first state being on, causing a driver layer of the display apparatus to connect to the eARC and disconnect from the ARC; and generating a second state according to a condition that the driver layer is connected to the eARC and disconnection from the ARC in the driver layer, and reporting the second state to a framework layer of the display apparatus, to cause the framework layer execute channel switching according to the second state, wherein the second state is configured to indicate connection or disconnection state of the eARC;

wherein the channel switching is configured to: in response to the second state being on, determine that the target channel is the eARC and control the display to change a switch control for switching to eARC to the on state, wherein the switch control is a control presented on a user interface on the display.

12. The method according to claim 11, further comprising:

in response to the second state being off, determining that the target channel is the ARC, reestablishing a connection to the ARC, and causing the display to set the switch control for switching to eARC to the off state on the user interface;

wherein the second state is off, in response to a connection failure of the eARC, timing out of a connection of the eARC, or detecting that the external power amplifier does not support the eARC while trying to establish a connection with the eARC.

13. The method according to claim 10, further comprising:

in response to the first state being off, causing a driver layer of the display apparatus to disconnect from the eARC, generating a second state and reporting the second state to a framework layer of the display apparatus, to cause the framework layer execute channel switching according to the second state, wherein the second state is off, and the channel switching is configured to: in response to the second state being off, determine that the target channel is the ARC, reestablish a connection to the ARC, and control the display to change a switch control for switching to eARC to the off state.

14. The method according to claim 9, further comprising:

monitoring on-off state of a consumer electronics control (CEC) function;

in response to the CEC function being switched from an on state to an off state, querying a current audio output channel of the display apparatus;

in response to the current audio output channel being the eARC, maintaining the eARC unchanged as the audio output channel and causing the display to present a first reminder message, wherein the first reminder message is configured to remind a user that the CEC function is already switched off and a volume of the audio output by the eARC is not available for adjustment via the remote controller.

15. The method according to claim 14, further comprising:

in response to the CEC function being switched from the on state to the off state and the current audio output channel being the ARC, sending an exit instruction to the external power amplifier, to switch the audio output channel to the sound playing device of the display apparatus and causing the display to present a second reminder message;

wherein the second reminder message is configured to remind the user that the CEC function is already switched off and the audio output channel is already automatically switched to the sound playing device, and the exit instruction is configured to instruct the external power amplifier to exit an ARC mode.

16. The method according to claim 9, wherein the response message comprises a physical address of an active source device.

* * * * *